US007789665B2

(12) United States Patent
Choi

(10) Patent No.: US 7,789,665 B2
(45) Date of Patent: Sep. 7, 2010

(54) EDUCATIONAL AID FOR VOCABULARY AND RECOGNITION OF FORM SPATIAL STRUCTURE AND WORD ENIGMA STRAWS

(75) Inventor: Jong Hak Choi, 17 Russell Park Rd., Syosset, NY (US) 11791

(73) Assignee: Jong hak Choi, Syosset, NY (US)

( * ) Notice: Subject to any disclaimer, the term of this patent is extended or adjusted under 35 U.S.C. 154(b) by 790 days.

(21) Appl. No.: 11/685,626

(22) Filed: Mar. 13, 2007

(65) Prior Publication Data
US 2008/0227059 A1    Sep. 18, 2008

(51) Int. Cl.
*G09B 19/00*    (2006.01)
(52) U.S. Cl. ...................... 434/156; 434/433
(58) Field of Classification Search .............. 434/81, 434/82, 128, 156, 167, 176, 188, 211, 214, 434/433; 239/33
See application file for complete search history.

(56) References Cited
U.S. PATENT DOCUMENTS

| | | | | |
|---|---|---|---|---|
| 2,811,808 A * | 11/1957 | Briese | ................... | 446/72 |
| 3,773,256 A * | 11/1973 | Wright | ................... | 239/1 |
| 5,316,483 A * | 5/1994 | Esterle | ................... | 434/211 |
| 5,507,495 A * | 4/1996 | Kiss | ................... | 273/243 |
| 5,722,219 A * | 3/1998 | Dobransky | ................... | 53/461 |
| 5,785,171 A * | 7/1998 | Howes | ................... | 206/232 |
| 5,957,279 A * | 9/1999 | Howes | ................... | 206/232 |
| 6,142,786 A * | 11/2000 | Culberson et al. | ................... | 434/258 |
| 6,460,777 B2 * | 10/2002 | Float et al. | ................... | 239/33 |
| 6,471,391 B1 * | 10/2002 | Opitz | ................... | 366/129 |
| 6,626,675 B1 * | 9/2003 | Webber | ................... | 434/156 |
| 6,814,300 B1 * | 11/2004 | Bernstorff | ................... | 239/35 |
| 2007/0001022 A1 * | 1/2007 | Chuang et al. | ................... | 239/33 |

* cited by examiner

*Primary Examiner*—Kurt Fernstrom

(57) ABSTRACT

Disclosed are educational straws having an end portion of a defined shape and the name of said shape displayed on the exterior body of the straw thereby instilling a cognitive recognition of a sequence of letters associated with the shape which will enhance vocabulary, spelling and object spatial recognition for a plurality of defined shapes.

10 Claims, 14 Drawing Sheets

EDUCATIONAL AID FOR VOCABULARY
AND RECOGNITION OF FORM SPATIAL
STRUCTURE AND WORD ENIGMA STRAWS

BACKGROUND OF THE INVENTION

1. Field of the Invention

The present invention relates generally to straws and, more specifically, to straws incorporating educational and enigma enhancement comprising an end portion of a shape and a corresponding descriptive name of the shape displayed on the exterior body of the straw thereby instilling a cognitive recognition of a sequence of letters associated with the shape which will enhance vocabulary, spelling and object spatial recognition for a plurality of various shapes including geometric shapes.

There are many type of straws in the prior art having various shapes and forms designed to amuse and entertain the user. The present invention enhances these useful traits and adds an educational facet by forming a portion of the straw body into a shape and placing the associative word for the shape on the exterior body of the straw. The shapes include geometric shapes and those shapes that are commonly found in books, periodicals, advertisements and objects. As an example, the sun is often depicted as a circle having a number of peripheral triangles that when depicted in outline resembles the sun; another example would be four overlapping ellipses that when taken in outline resembles a cloud; another example would be four conjoined circles that when taken in outline would resemble a four leaf clover or a group of balloons; another example would be a side view of a car taken in outline would resemble a car, auto, automobile and motor vehicle, any of which are descriptive words that can be associated with the shape. The same would apply for a boat or a plane, although a plane having a somewhat cross-shape would necessitate putting the shaped end into the beverage more out of necessity than choice but it is provided that users may choose either end as the mouth engaging end.

Preferably, the portion of the straw forming the outlined shape is an end where the rim of the straw is the outlined shape and extends into the body forming the shaped portion of the straw. The shaped portion of the straw, while depicted throughout the drawing figures as on the end of the straw, may be formed in the body of the straw by distending the straw body to the shaped portion, extending the shaped portion for an appropriate distance and distending the shaped portion back to the body portion.

Additionally, the present invention provides for an additional element in the form of a lip engaging portion(s) which is one or more curvilinearly extending planar surfaces that may be necessary for the child to sealingly engage the straw body with their lips for irregular shapes such as the aforementioned sun shape.

It is also provided by the present invention that incorporation of a flexible portion within the shaped portion can produce a shaped portion having a deployable portion.

Additionally provided for is using the accordion folds to conceal an enigma portion that can be used in conjunction with a plurality of similar straws in games and contests ranging from simply guessing the word descriptor before expanding the flexible portion to reveal the descriptor word; providing a plurality of straws having a single straw with a unique indicator identifiable through letters, numbers, glifs, images, graphics, pictures, words and combinations thereof and includes providing an enigma portion which is a concealed answer to some other viewable straw copy. An example of the former would be a straw copy of: Your Lucky Numbers—with the numbers concealed in the accordion folds; or a straw copy of: Are these your Lucky Numbers? 1, 15, 18, 23, 45, . . . n,—with the closed accordion fold concealing some enigma qualifying indicator, such as astrological sign, favorite color, riddle, personality trait or other qualifying indicator.

In use, the straw can be inverted so that the shape is in the beverage.

2. Description of the Prior Art

There are other straws designed for beverages. While these straws may be suitable for the purposes for which they were designed, they would not be as suitable for the purposes of the present invention, as hereinafter described.

SUMMARY OF THE PRESENT INVENTION

A primary object of the present invention is to provide a straw as an educational media.

An additional object of the present invention is to provide a plurality of different shaped straws in combination with a package forming a packaged set of educational straws.

Another object of the present invention is to provide a straw comprising a body portion and a shaped portion.

An additional object of the present invention is to provide a straw wherein the body portion is typically tubular.

Another object of the present invention is to provide a straw wherein the shaped portion is created by the wall of the straw forming an outline of a discernable shape.

An additional object of the present invention is to provide a straw having a flexible portion used in combination with the body portion and the shaped portion that may be incorporated into the body portion and/or shaped portion and may additionally serve to separate the body portion from the shaped portion.

A further object of the present invention is to provide a straw having a flexible portion interdisposed with the shaped portion to produce a deployable portion.

A yet further object of the present invention is to provide a straw with a flexible portion that can be used to create an enigma portion by concealing some value within the closed accordion folds of the flexible portion that can only be revealed by extending the folds to their open position and therein revealing the copy of the accordion folds.

A still further object of the present invention is to provide a straw with a flexible portion having an accordion-like folds portion having copy thereon that serves as a user discernable qualifier to determine whether the viewable straw copy pertains to the user.

Another object of the present invention is to provide a set of straws having a flexible portion comprising an accordion-like folds portion having copy thereon with one or more straws having accordion-folds copy of a discernable unique identifier so that the set can be used in a selection process as deemed by the user.

Yet another object of the present invention is to provide a straw wherein one or more viewable words appear on the straw defining the discernable shaped portion of the straw.

Still yet another object of the present invention is to provide a straw wherein the one or more viewable words appear on the shaped portion with a planar portion provided on the shaped portion for placement of the one or more words describing the shaped portion.

Additional objects of the present invention will appear as the description proceeds.

The present invention overcomes the shortcomings of the prior art by providing educational straws having an end portion of a defined shape and the name of said shape displayed on the exterior body of the straw thereby instilling a cognitive recognition of a sequence of letters associated with the shaped portion which will enhance vocabulary, spelling and object spatial recognition for a plurality of shapes.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
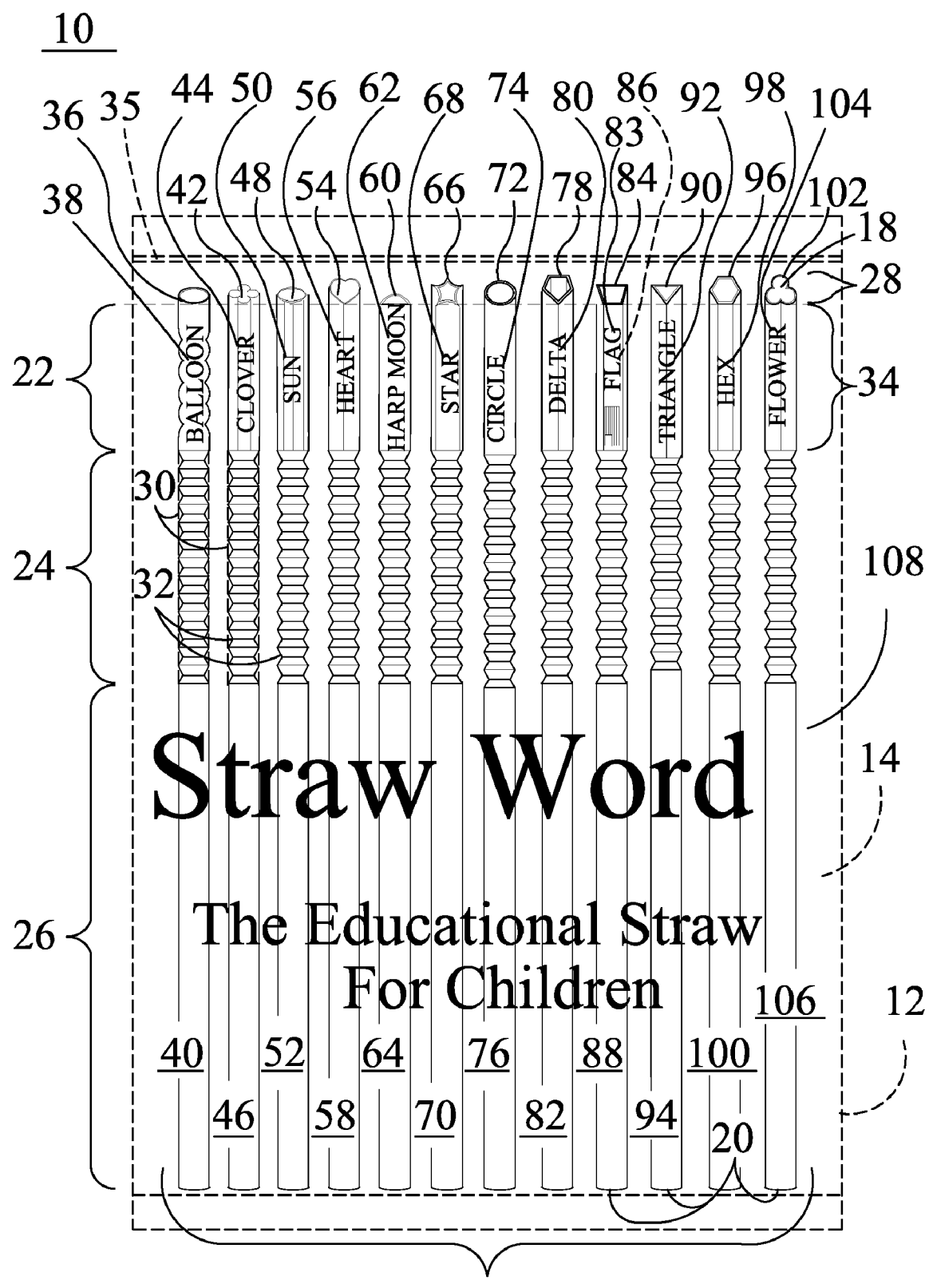
FIG. 1 is an illustrated view of the present invention.

Turning now descriptively to the drawings, in which similar reference characters denote similar elements throughout the several views, the Figures illustrate the hybrid induction motor of the present invention. With regard to the reference numerals used, the following numbering is used throughout the various drawing Figures.

10 shaped straw and descriptor of the present invention
12 package of 10
14 compartment of 12
16 straws of 10
18 end bore
20 end bore
22 shaped portion
24 flexible portion
26 body portion
28 shape
30 rigid body portion
32 flexible body portion
34 descriptor
35 package fastener
36 balloon shape
38 "Balloon" shape name
40 body of balloon straw
42 clover shape
44 "Clover" shape name
46 body of clover straw
48 sun shape
50 "Sun" shape name
52 body of sun straw
54 heart shape
56 "Heart" shape name
58 body of heart straw
60 harp moon shape
62 "Harp moon" shape name
64 body of harp moon straw
66 star shape
68 "Star" shape name
70 body of star straw
72 circle shape
74 "Circle" shape name
76 body of circle straw
78 delta shape
80 "Delta" shape name
82 body of delta straw
83 flag image
84 square shape
85 flag name
86 "Square" shape name
88 body of square straw
90 triangle shape
92 "Triangle" shape name
94 body of triangle straw
96 hex shape
98 "Hex" shape name
100 body of hex straw
102 flower shape
104 "Flower" shape name
105 stand-off of 34
106 body of flower straw
108 indicia of 12
110 copy of 16
112 enigma portion
114 copy of 112
116 accordion-like folds in compressed state
118 accordion-like folds in extended state

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

FIG. 1 is an illustrated view of the present invention. The present invention is a learning tool comprising a set of straws having a word shown on the body of the straw that describes the particular shape of at least one end portion of the straw which can teach the user object spatial recognition, associated vocabulary and spelling. In the preferred embodiment of the present invention 10, a package 12 having compartment 14 with a plurality of straws 16 having shaped bore 18 and bore 20 are provided with various shapes as illustrated. Shown is the educational set of straws where each straw is comprised of a shaped portion 22 and body portion 26 that may include flexure portion 24 by incorporating flexure section 32 into body 26 which also provides a straw variant having the typical conduit 30 conjoined to shaped portion 22 having shape 28 with descriptor word 34 defining the shape 28.

Package 12 also provides access 35 that may incorporate a resealable closure. Additionally the present invention provides that in operation the user can invert the straw having either bore 18, 20 in the beverage while the other is in the user's mouth respectively.

Also shown is balloon shape 36 having descriptor word "Balloon" 38 appearing on the straw body 40 that optionally provides for conjoining shape 36 with body portion 40 using a typical smooth housing 30 or incorporating flexure joint 32 creating flexure portion 24. Also shown is clover shape 42 having descriptor word "Clover" 44 appearing on the straw body 46 that optionally provides for conjoining shape 42 with body portion 46 using a typical smooth housing 30 or incorporating flexure joint 32 creating flexure portion 24. Also shown is sun shape 48 having descriptor word "Sun" 50 appearing on the straw body 52 that optionally provides for conjoining shape 48 with body portion 52 using a typical smooth housing 30 or incorporating flexure joint 32 creating flexure portion 24. Also shown is heart shape 54 having descriptor word "Heart" 56 appearing on the straw body 58 that optionally provides for conjoining shape 54 with body portion 58 using a typical smooth housing 30 or incorporating flexure joint 32 creating flexure portion 24. Also shown is harp moon shape 60 having descriptor words "Harp Moon" 62 appearing on the straw body 64 that optionally provides for conjoining shape 60 with body portion 64 using a typical smooth housing 30 or incorporating flexure joint 32 creating flexure portion 24. Also shown is star shape 66 having descriptor word "Star" 68 appearing on the straw body 70 that optionally provides for conjoining shape 66 with body portion 70 using a typical smooth housing 30 or incorporating flexure joint 32 creating flexure portion 24. Also shown is circle shape 72 having descriptor word "Circle" 74 appearing on the straw body 76 that optionally provides for conjoining shape 72 with body portion 76 using a typical smooth housing 30 or incorporating flexure joint 32 creating flexure portion 24. Also shown is delta shape 78 having descriptor word "Delta" 80 appearing on the straw body 82 that optionally provides for conjoining shape 78 with body portion 82 using a typical smooth housing 30 or incorporating flexure joint 32 creating flexure portion 24. Also shown is square shape 84 having flag image 83 appearing on the straw body 88 that optionally provides for conjoining shape 84 with body portion 88 using a typical smooth housing 30 or incorporating flexure joint 32 creating flexure portion 24. Also shown is triangle shape 90 having descriptor word "Triangle" 92 appearing on the straw body 94 that optionally provides for conjoining shape 90 with body portion 94 using a typical smooth housing 30 or incorporating flexure joint 32 creating flexure portion 24. Also shown is hex shape 96 having descriptor word "Hex" 98 appearing on the straw body 100 that optionally provides for conjoining shape 96 with body portion 100 using a typical smooth housing 30 or incorporating flexure joint 32 creating flexure portion 24. Also shown is flower shape 102 having descriptor word "Flower" 104 appearing on the straw body 106 that optionally provides for conjoining shape 102 with body portion 106 using a typical smooth housing 30 or incorporating flexure joint 32 creating flexure portion 24.

Figure 2:
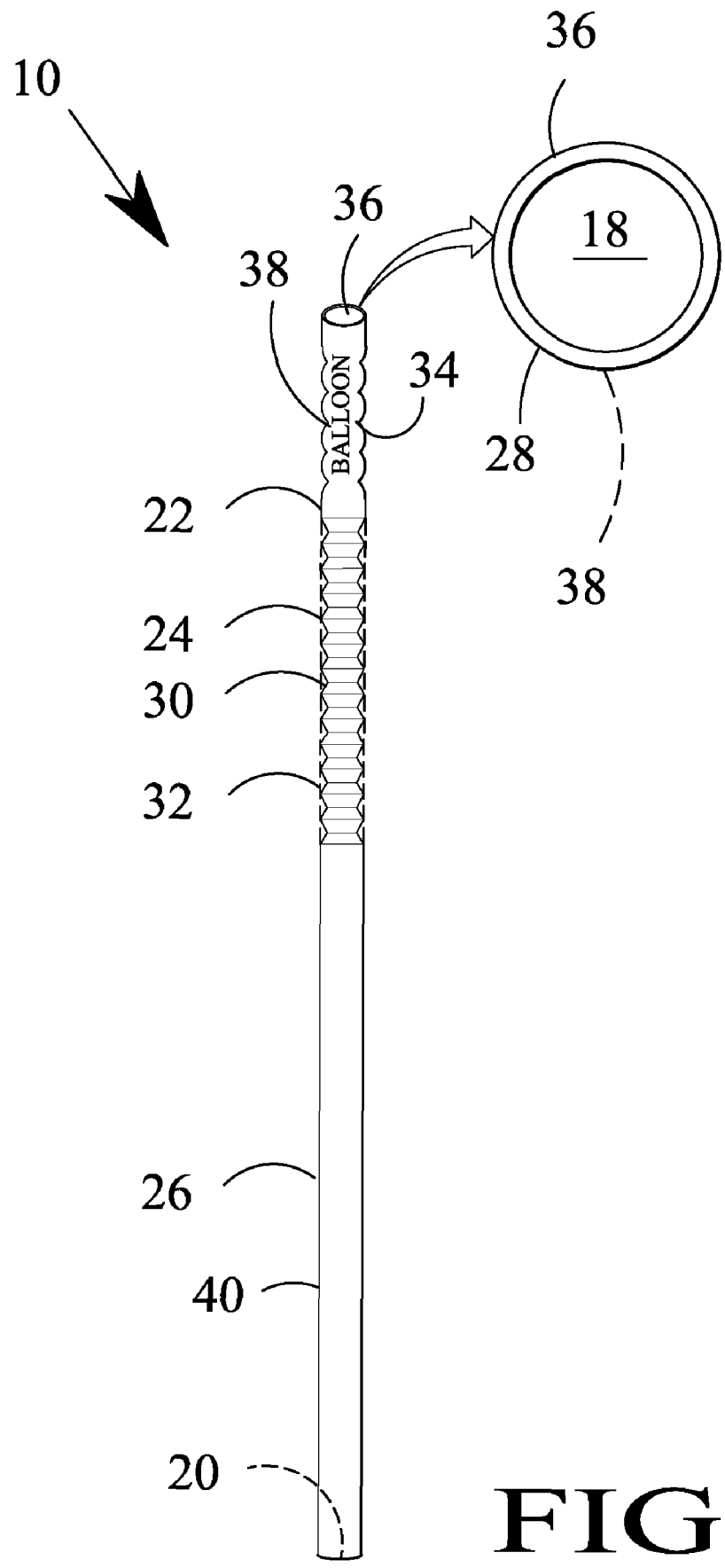
FIG. 2 is an illustrative view of a variant of the educational straw of the present invention.

Referring to FIG. 2, shown is an illustrative view of a variant of the educational straw of the present invention. Depicted is straw 10 extending between bore 18 and bore 20 comprising shaped portion 22 having shape 28 and body portion 26 that may mate with the shaped portion by tubular wall 30 or may incorporate flexure section 32 forming flexure portion 24. The shape variant 28 illustrated is that of a balloon shape 36 having descriptor word 34 comprising the shape descriptive word "Balloon" 38 with the body portion terminating in bottom portion 40 that may have a similar cross sectional shape as that of the shaped portion 22 or a dissimilar cross sectional shape.

Figure 3:
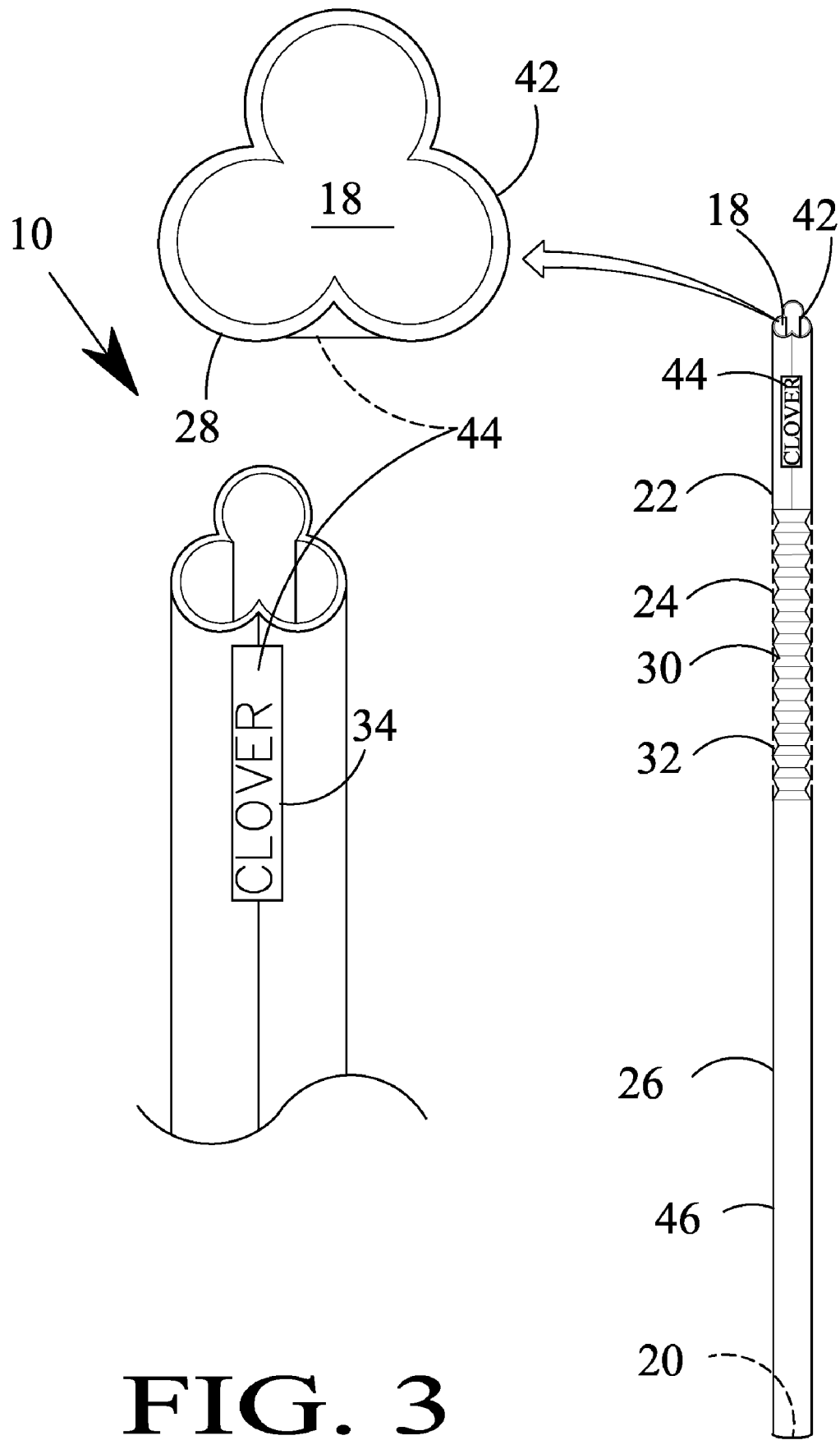
FIG. 3 is an illustrative view of a variant of the educational straw of the present invention.

Referring to FIG. 3, shown is an illustrative view of a variant of the educational straw of the present invention. Depicted is straw 10 extending between bore 18 and bore 20 comprising shaped portion 22 having shape 28 and body portion 26 that may mate with the shaped portion by tubular wall 30 or may incorporate flexure section 32 forming flexure portion 24. The shape variant 28 illustrated is that of a clover shape 42 having descriptor word 34 comprising the shape descriptive word "Clover" 44 with the body portion terminating in bottom portion 46 that may have a similar cross sectional shape as that of the shaped portion 22 or a dissimilar cross sectional shape.

Figure 4:
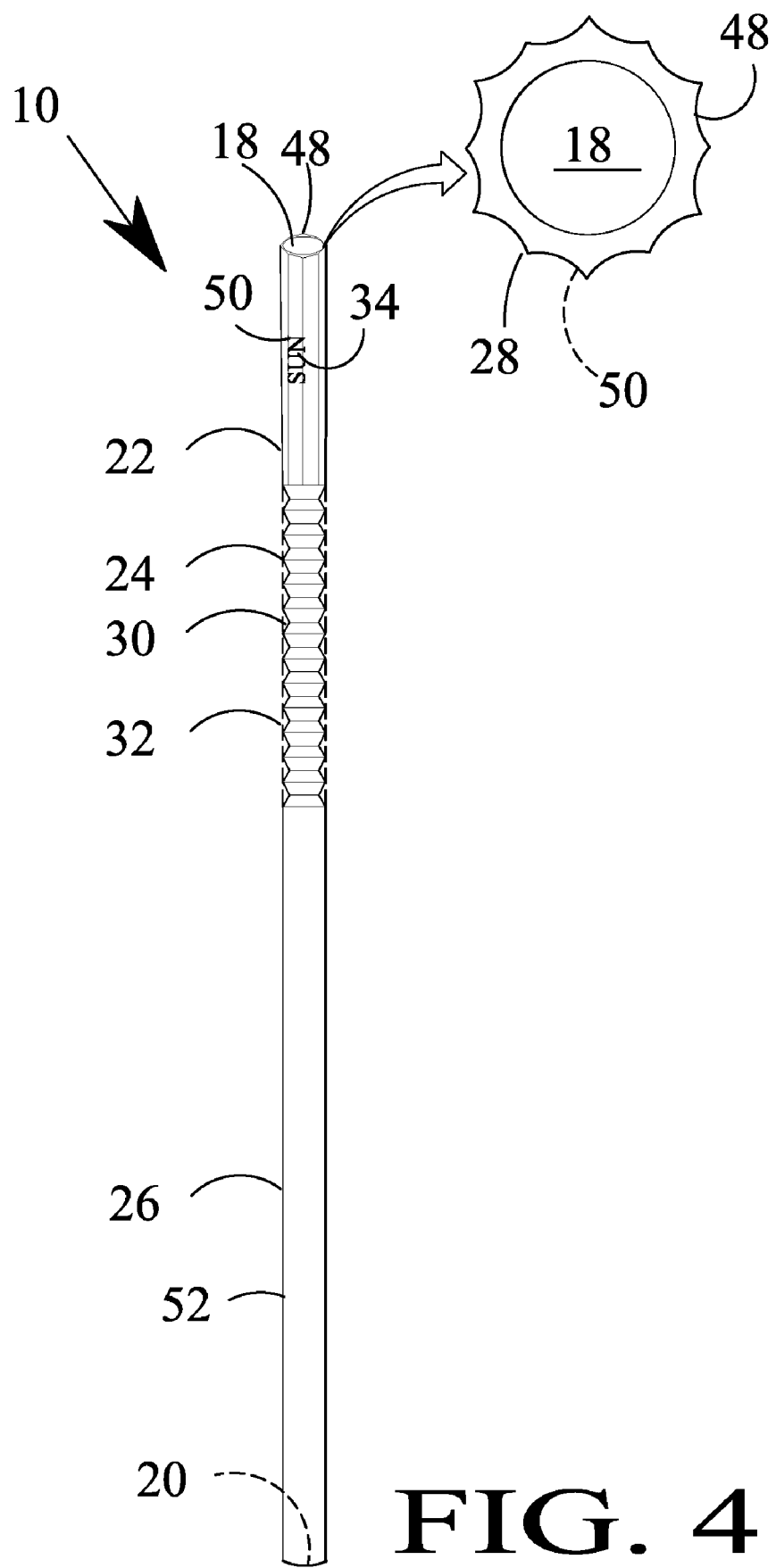
FIG. 4 is an illustrative view of a variant of the educational straw of the present invention.

Referring to FIG. 4, shown is an illustrative view of a variant of the educational straw of the present invention. Depicted is straw 10 extending between bore 18 and bore 20 comprising shaped portion 22 having shape 28 and body portion 26 that may mate with the shaped portion by tubular wall 30 or may incorporate flexure section 32 forming flexure portion 24. The shape variant 28 illustrated is that of a sun shape 48 having descriptor word 34 comprising the shape descriptive word "Sun" 50 with the body portion terminating in bottom portion 52 that may have a similar cross sectional shape as that of the shaped portion 22 or a dissimilar cross sectional shape.

Figure 5:
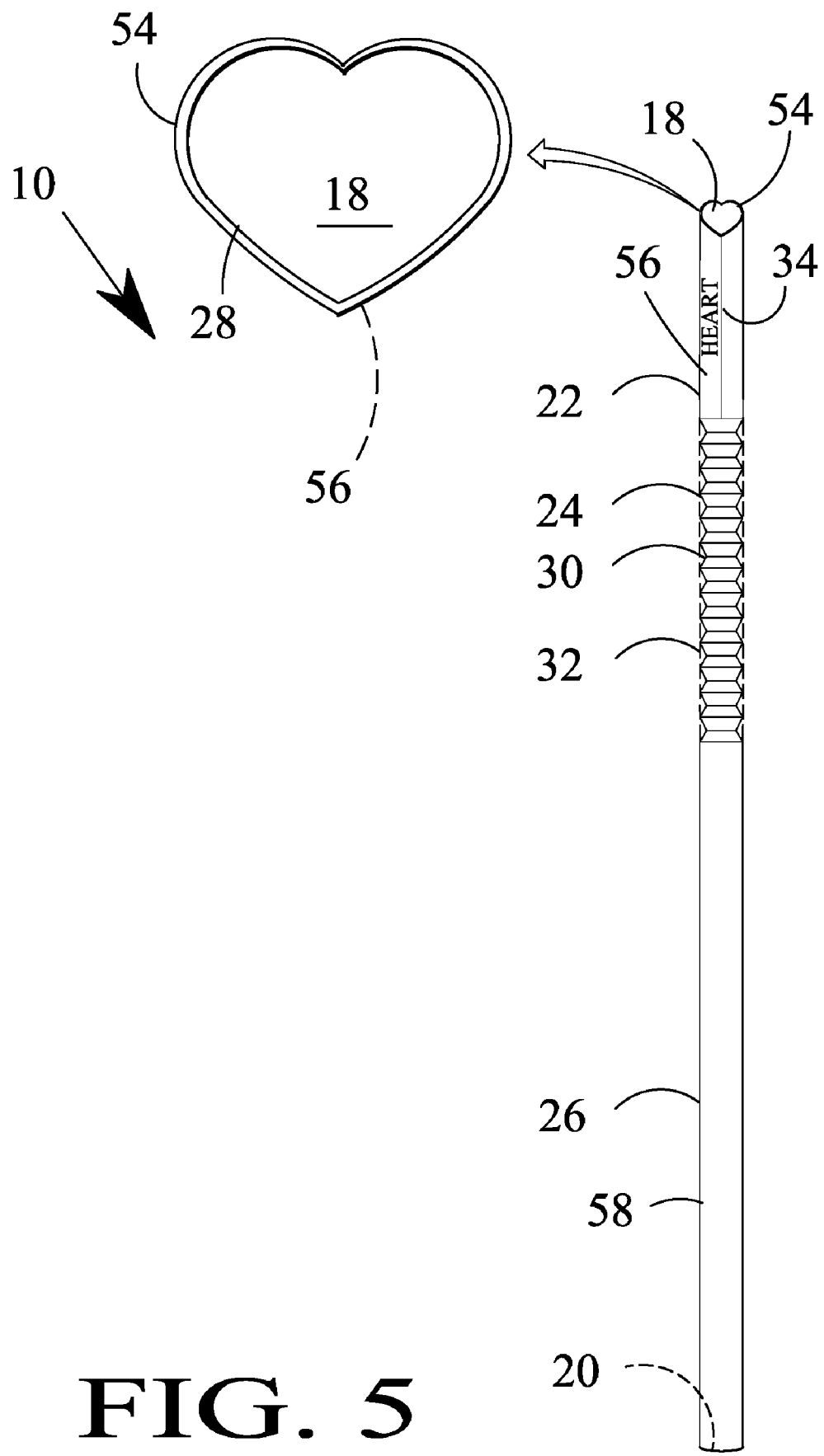
FIG. 5 is an illustrative view of a variant of the educational straw of the present invention.

Referring to FIG. 5, shown is an illustrative view of a variant of the educational straw of the present invention. Depicted is straw 10 extending between bore 18 and bore 20 comprising shaped portion 22 having shape 28 and body portion 26 that may mate with the shaped portion by tubular wall 30 or may incorporate flexure section 32 forming flexure portion 24. The shape variant 28 illustrated is that of a heart shape 54 having descriptor word 34 comprising the shape descriptive word "Heart" 56 with the body portion terminating in bottom portion 58 that may have a similar cross sectional shape as that of the shaped portion 22 or a dissimilar cross sectional shape.

Figure 6:
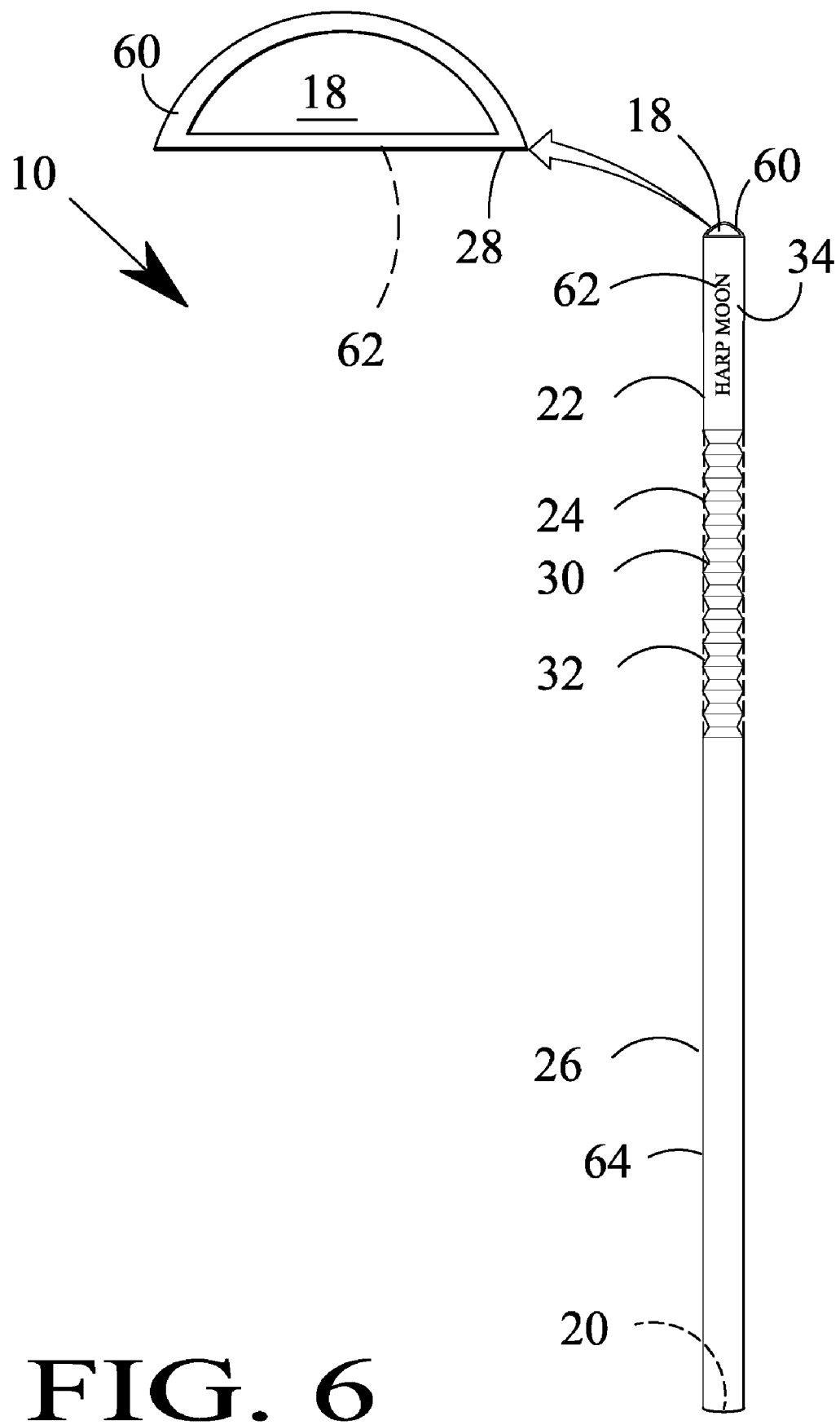
FIG. 6 is an illustrative view of a variant of the educational straw of the present invention.

Referring to FIG. 6, shown is an illustrative view of a variant of the educational straw of the present invention. Depicted is straw 10 extending between bore 18 and bore 20 comprising shaped portion 22 having shape 28 and body portion 26 that may mate with the shaped portion by tubular wall 30 or may incorporate flexure section 32 forming flexure portion 24. The shape variant 28 illustrated is that of a harp moon shape 60 having descriptor word 34 comprising the shape descriptive word "Harp moon" 62 with the body portion terminating in bottom portion 64 that may have a similar cross sectional shape as that of the shaped portion 22 or a dissimilar cross sectional shape.

Figure 7:
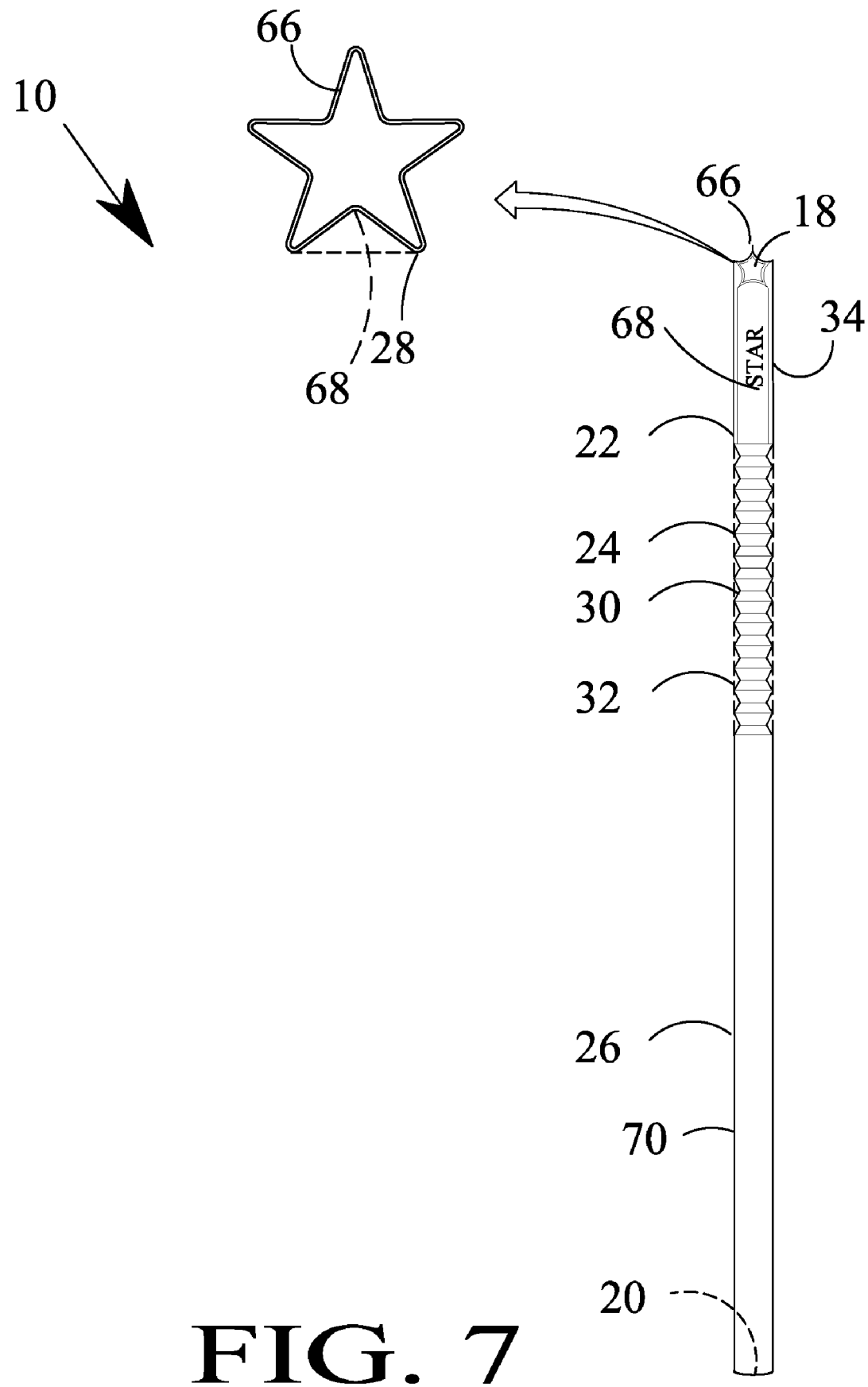
FIG. 7 is an illustrative view of a variant of the educational straw of the present invention.

Referring to FIG. 7, shown is an illustrative view of a variant of the educational straw of the present invention. Depicted is straw 10 extending between bore 18 and bore 20 comprising shaped portion 22 having shape 28 and body portion 26 that may mate with the shaped portion by tubular wall 30 or may incorporate flexure section 32 forming flexure portion 24. The shape variant 28 illustrated is that of a star shape 66 having descriptor word 34 comprising the shape descriptive word "Star" 68 with the body portion terminating in bottom portion 70 that may have a similar cross sectional shape as that of the shaped portion 22 or a dissimilar cross sectional shape.

Figure 8:
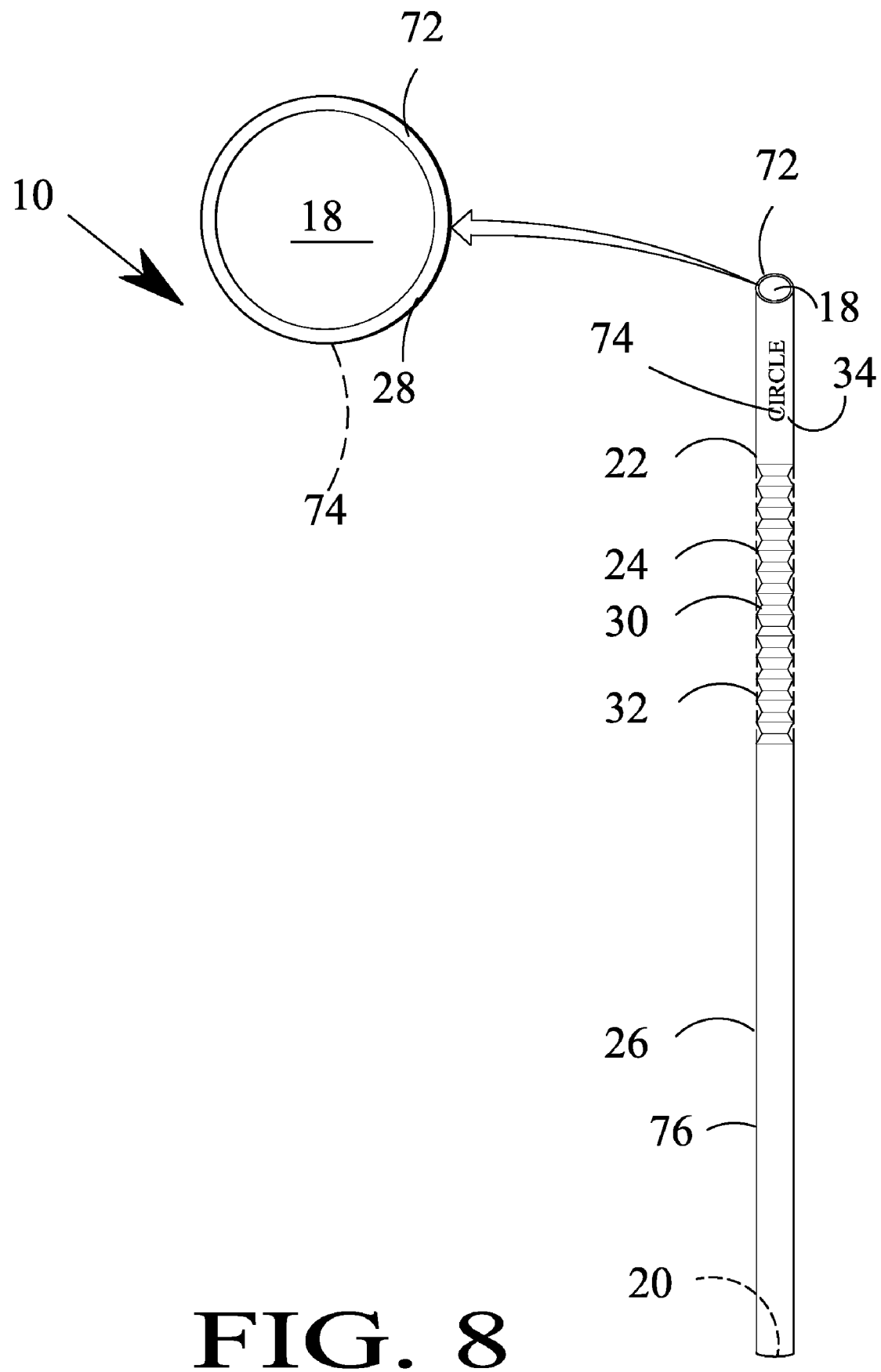
FIG. 8 is an illustrative view of a variant of the educational straw of the present invention.

Referring to FIG. 8, shown is an illustrative view of a variant of the educational straw of the present invention. Depicted is straw 10 extending between bore 18 and bore 20 comprising shaped portion 22 having shape 28 and body portion 26 that may mate with the shaped portion by tubular wall 30 or may incorporate flexure section 32 forming flexure portion 24. The shape variant 28 illustrated is that of a circle shape 72 having descriptor word 34 comprising the shape descriptive word "Circle" 74 with the body portion terminating in bottom portion 76 that may have a similar cross sectional shape as that of the shaped portion 22 or a dissimilar cross sectional shape.

Figure 9:
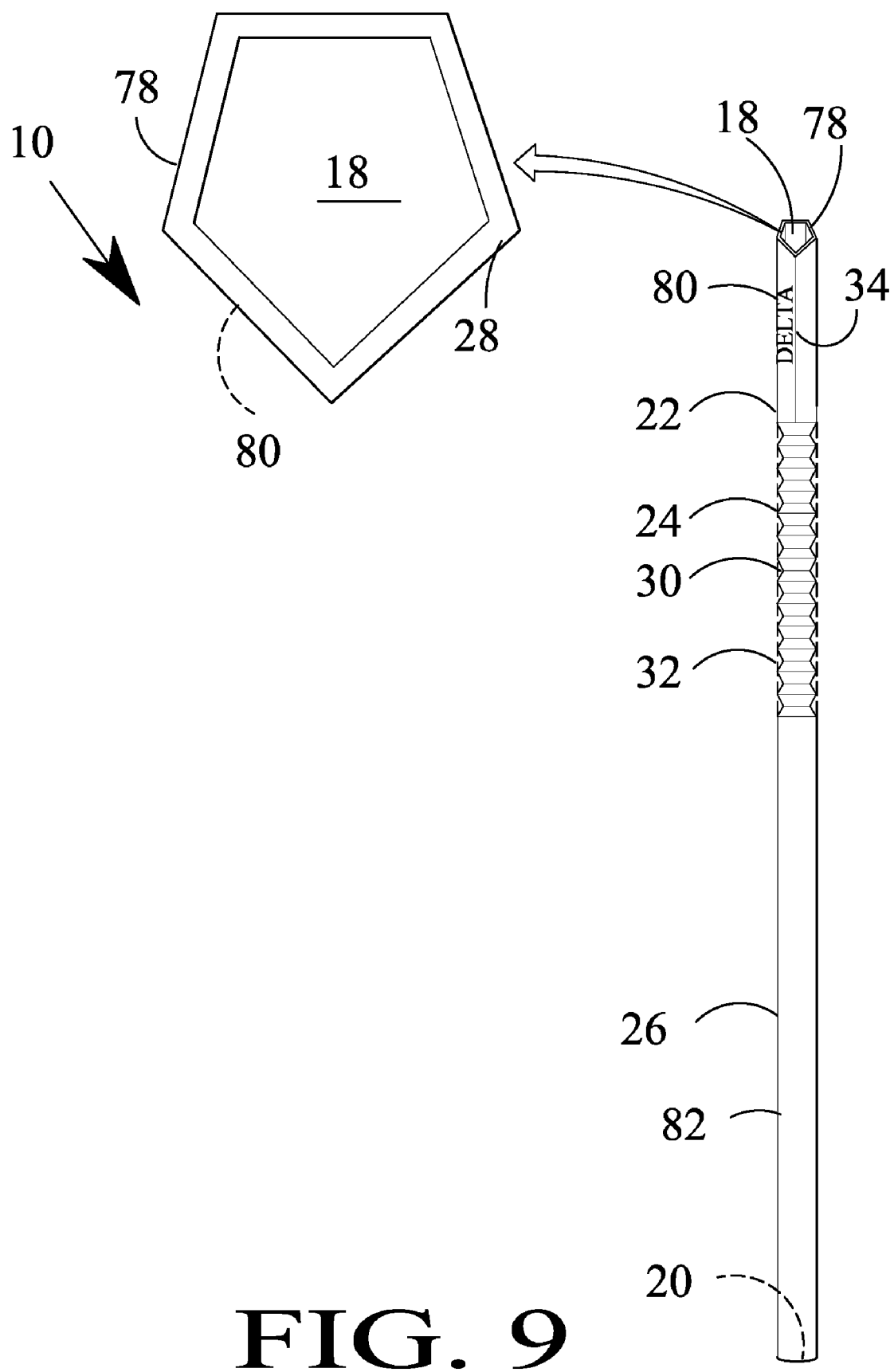
FIG. 9 is an illustrative view of a variant of the educational straw of the present invention.

Referring to FIG. 9, shown is an illustrative view of a variant of the educational straw of the present invention. Depicted is straw 10 extending between bore 18 and bore 20 comprising shaped portion 22 having shape 28 and body portion 26 that may mate with the shaped portion by tubular wall 30 or may incorporate flexure section 32 forming flexure portion 24. The shape variant 28 illustrated is that of a delta shape 78 having descriptor word 34 comprising the shape descriptive word "Delta" 80 with the body portion terminating in bottom portion 82 that may have a similar cross sectional shape as that of the shaped portion 22 or a dissimilar cross sectional shape.

Figure 10:
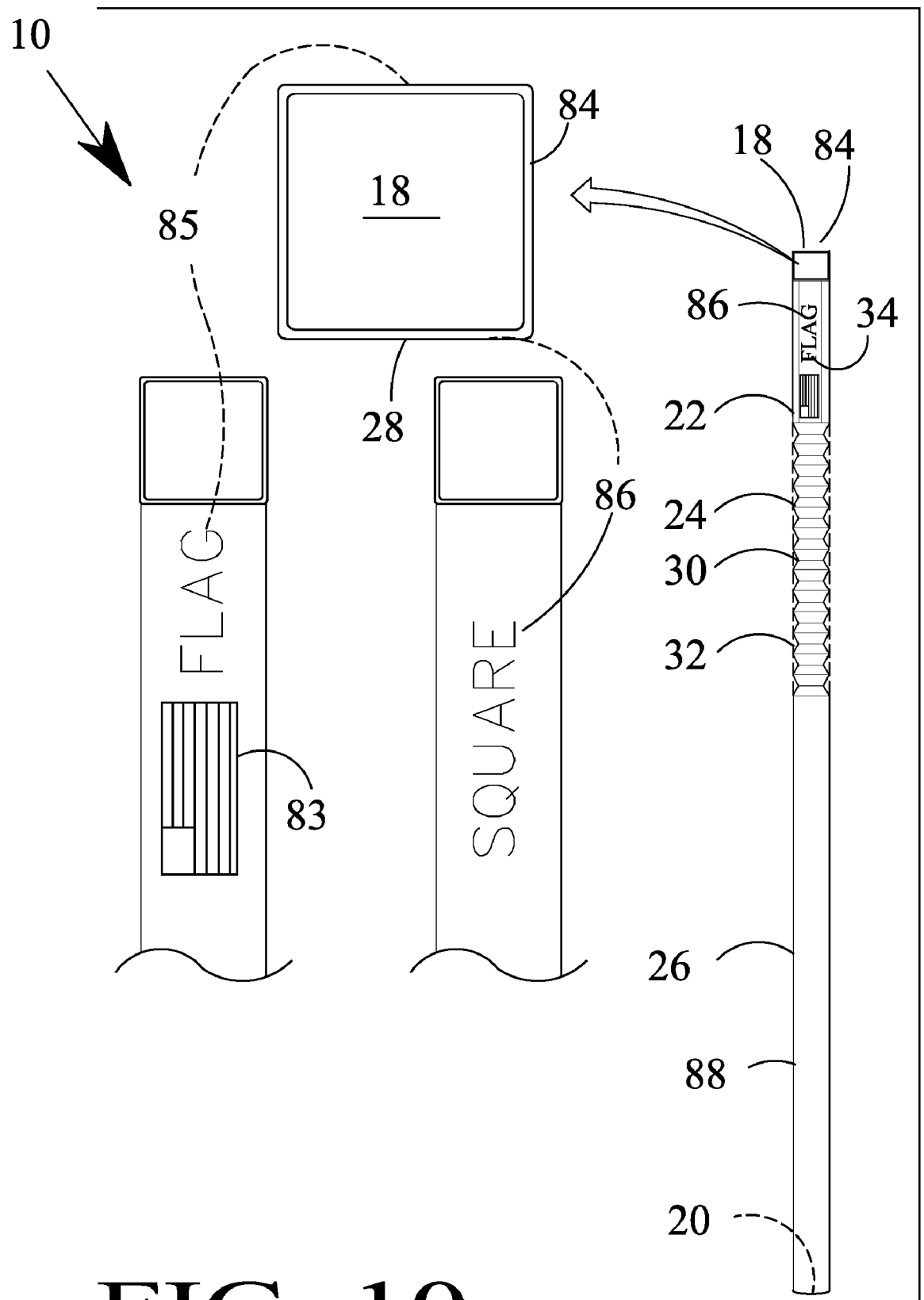
FIG. 10 is an illustrative view of a variant of the educational straw of the present invention.

Referring to FIG. 10, shown is an illustrative view of a variant of the educational straw of the present invention. Depicted is straw 10 extending between bore 18 and bore 20 comprising shaped portion 22 having shape 28 and body portion 26 that may mate with the shaped portion by tubular wall 30 or may incorporate flexure section 32 forming flexure portion 24. The shape variant 28 illustrated is that of a square shape 84 having descriptor word 34 comprising the shape descriptive word "Square" 86 with the body portion terminating in bottom portion 88 that may have a similar cross sectional shape as that of the shaped portion 22 or a dissimilar cross sectional shape. Also shown is an additional element of the present invention 10, comprising positioning an image, graphic, picture, text or combination thereof in addition to or in lieu of descriptor word 34 upon the surface of the straw. As illustrated flag image 83 is positioned on the exterior surface having flag name 85 also positioned thereon.

Figure 11:
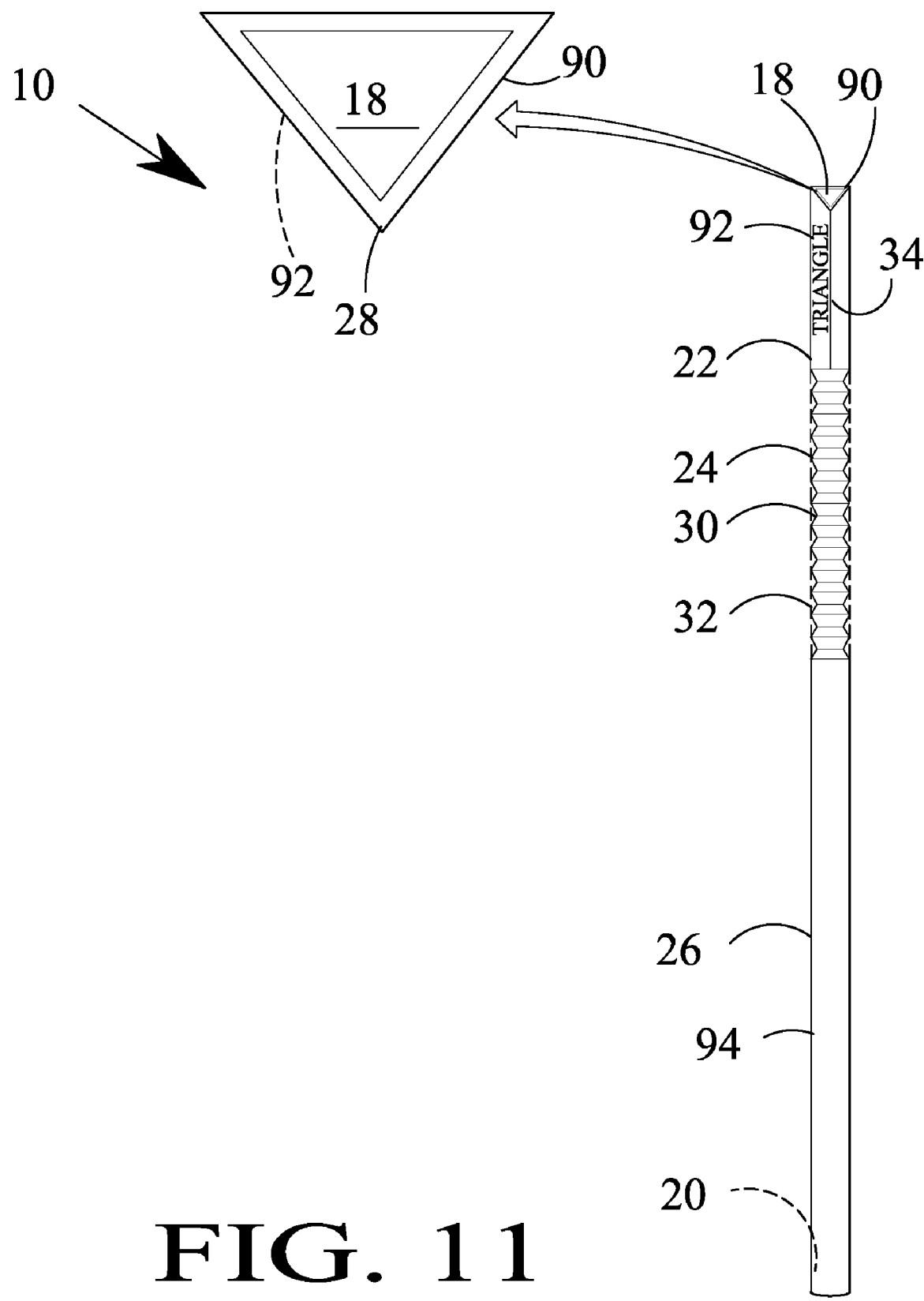
FIG. 11 is an illustrative view of a variant of the educational straw of the present invention.

Referring to FIG. 11, shown is an illustrative view of a variant of the educational straw of the present invention. Depicted is straw 10 extending between bore 18 and bore 20 comprising shaped portion 22 having shape 28 and body portion 26 that may mate with the shaped portion by tubular wall 30 or may incorporate flexure section 32 forming flexure portion 24. The shape variant 28 illustrated is that of a triangle shape 90 having descriptor word 34 comprising the shape descriptive word "Triangle" 92 with the body portion terminating in bottom portion 94 that may have a similar cross sectional shape as that of the shaped portion 22 or a dissimilar cross sectional shape.

Figure 12:
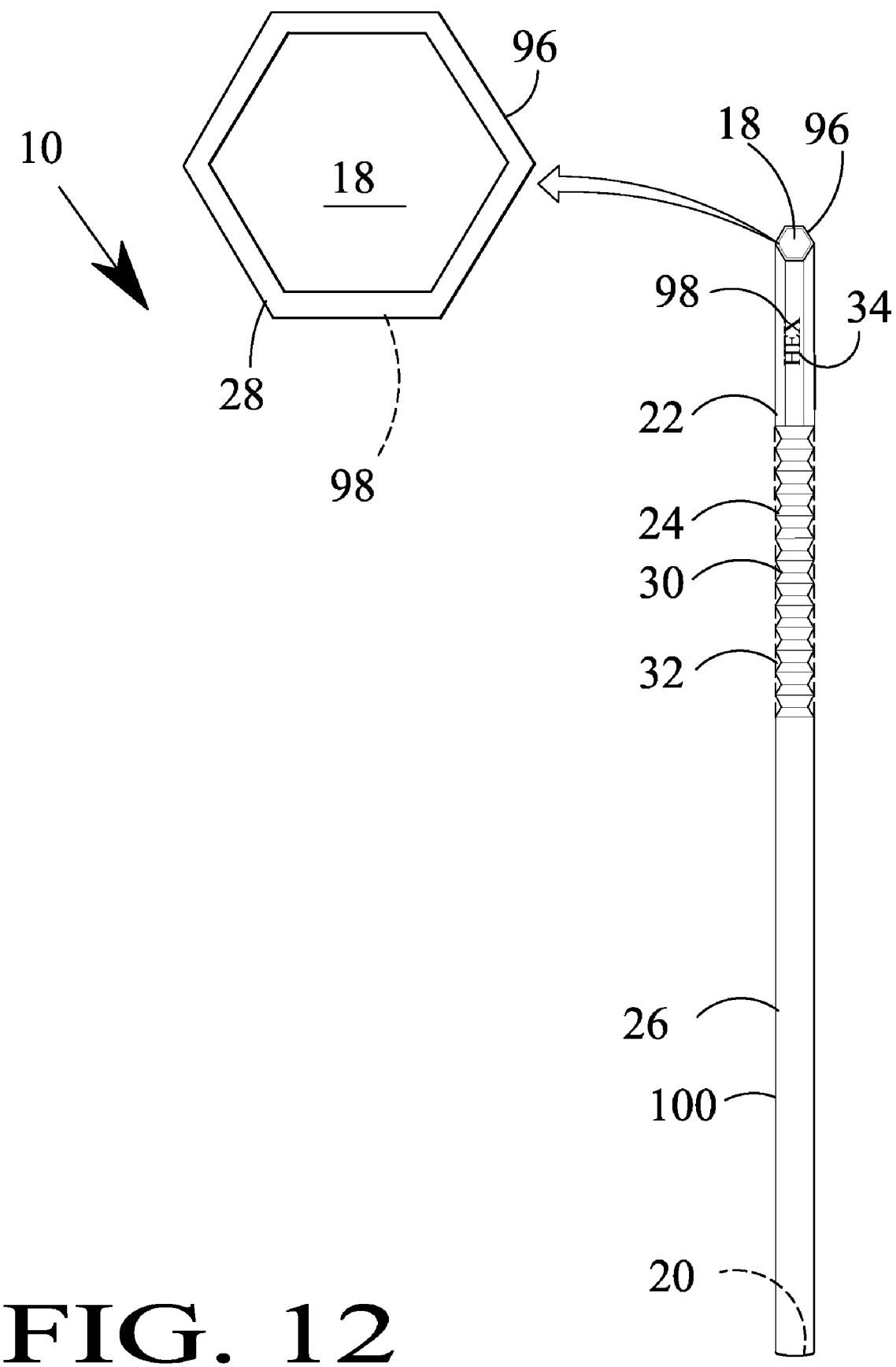
FIG. 12 is an illustrative view of a variant of the educational straw of the present invention.

Referring to FIG. 12, shown is an illustrative view of a variant of the educational straw of the present invention. Depicted is straw 10 extending between bore 18 and bore 20 comprising shaped portion 22 having shape 28 and body portion 26 that may mate with the shaped portion by tubular wall 30 or may incorporate flexure section 32 forming flexure portion 24. The shape variant 28 illustrated is that of a hex shape 96 having descriptor word 34 comprising the shape descriptive word "Hex" 98 with the body portion terminating in bottom portion 100 that may have a similar cross sectional shape as that of the shaped portion 22 or a dissimilar cross sectional shape.

Figure 13:
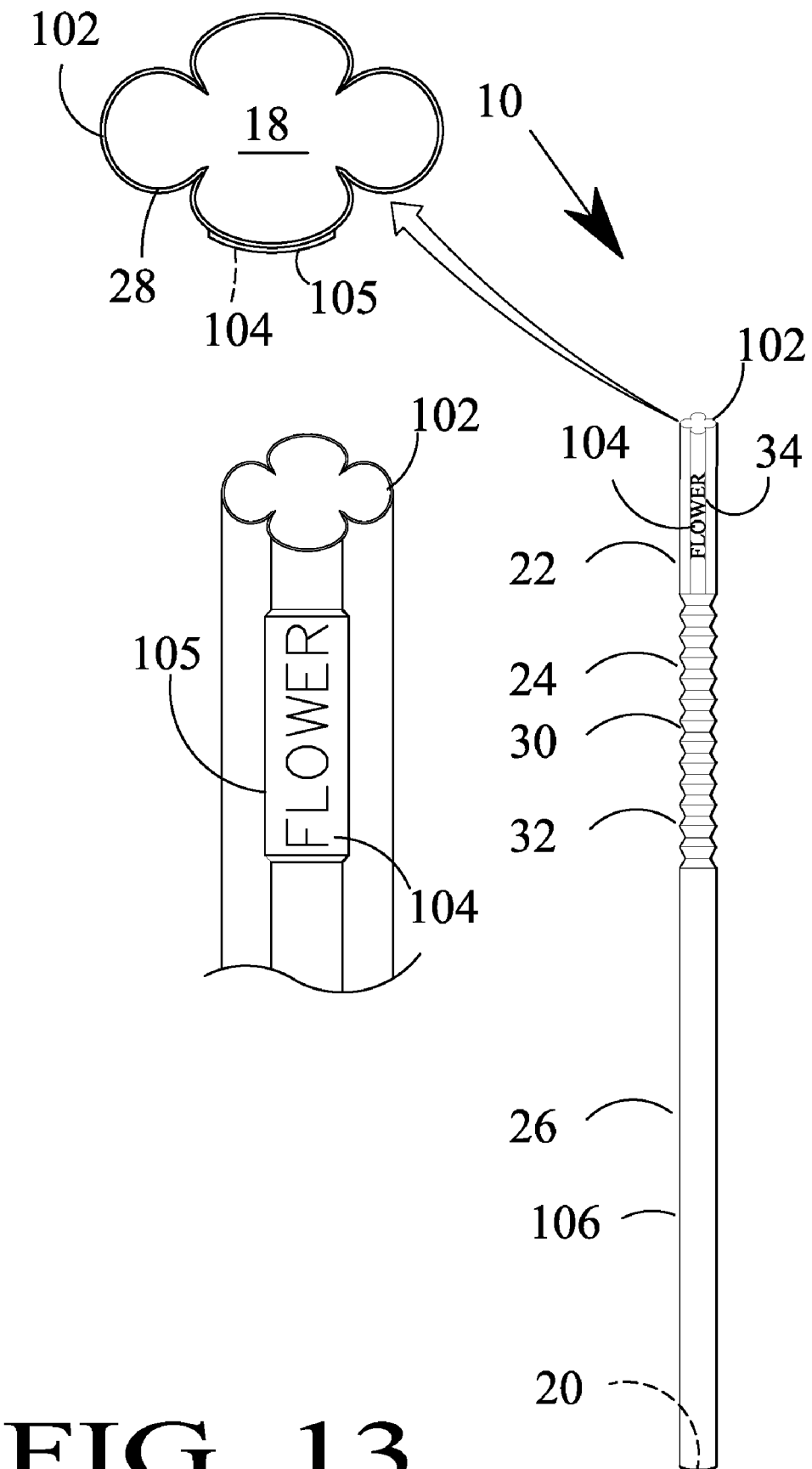
FIG. 13 is an illustrative view of a variant of the educational straw of the present invention.

Referring to FIG. 13, shown is an illustrative view of a variant of the educational straw of the present invention. Depicted is straw 10 extending between bore 18 and bore 20 comprising shaped portion 22 having shape 28 and body portion 26 that may mate with the shaped portion by tubular wall 30 or may incorporate flexure section 32 forming flexure portion 24. The shape variant 28 illustrated is that of a flower shape 102 having descriptor word 34 comprising the shape descriptive word "Flower" 104 with the body portion terminating in bottom portion 106 that may have a similar cross sectional shape as that of the shaped portion 22 or a dissimilar cross sectional shape.

Figure 14:
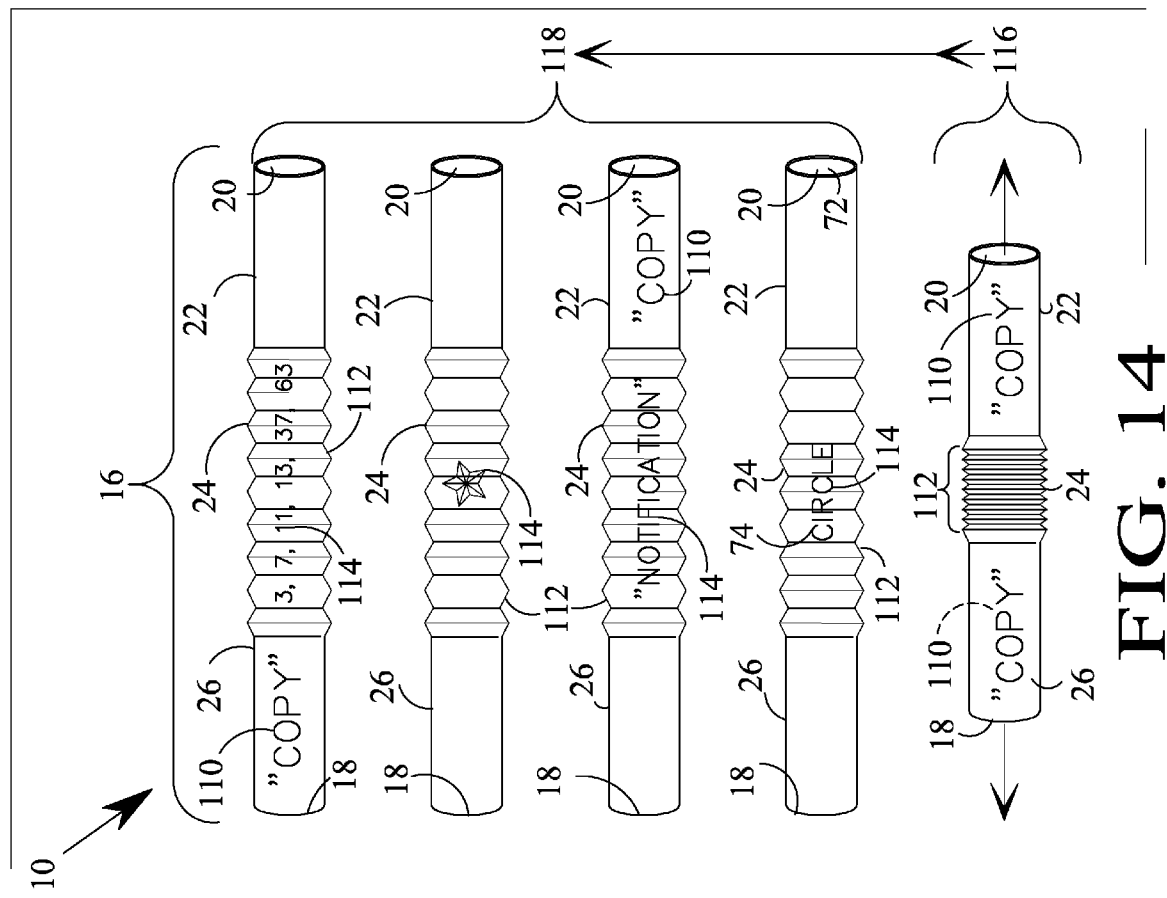
FIG. 14 is another embodiment of the present invention.

Referring to FIG. 14, shown is another embodiment of the present invention. Depicted is straw 10 extending between bore 18 and bore 20 comprising shaped portion 22 having shape 28 and body portion 26 with flexure portion 24.forming enigma portion 112 having copy 114 which is not visible when straw 16 is in a folded state 116 and is visible when straw 16 is extended to an unfolded state 118 whereupon copy 114 is visible. Straw 10 of the present invention provides that copy 110 includes descriptor word 34 as well as copy designed to entice the user to discover the enigma copy 114.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An educational straw comprising:
    a) a shaped portion formed on the straw end and extending through a portion of the body forming a straw shaped portion;
    b) a body portion conjoined to the shaped portion and extending to an opposing end; and
    c) a descriptor appearing on the straw defining that portion of the straw having a preformed shape wherein said descriptor is at least one name defining the shaped portion.

2. The educational straw as recited in claim 1, further comprising an accordion-like portion positioned within the body of the straw creating a flexible portion.

3. The educational straw as recited in claim 1, wherein said flexible portion is positioned between the body of the straw and the shaped portion of the straw.

4. The educational straw as recited in claim 3, wherein the aforementioned descriptor on said straw appears on the accordion-like folds of the flexible portion.

5. The educational straw as recited in claim 3, wherein said descriptor word is not visible when the flexible portion is collapsed and is visible when the flexible portion is expanded thereby providing at least one concealed answer as to the name of the shape.

6. The educational straw as recited in claim 3, wherein said descriptor name defining a shaped straw portion has more than one defining descriptor because wheel, ball and moon all have a circular outline.

7. The educational straw as recited in claim 1, wherein a plurality of educational straws are packaged as an educational tool.

8. The educational straw as recited in claim 7, wherein the plurality of packaged educational straws are of the same educational straw shape.

9. The educational straw as recited in claim 7, wherein the plurality of packaged educational straws are of mixed educational straw shapes.

10. The educational straw as recited in claim 7, wherein the plurality of packaged educational straws are theme based providing a plurality of different names for a particular shape.

* * * * *